(12) United States Patent
Kanakadandi et al.

(10) Patent No.: US 8,898,236 B2
(45) Date of Patent: Nov. 25, 2014

(54) AUTOMATED CONVERSION OF VERSIONED DATA COLLECTIONS

(75) Inventors: Kiran Kanakadandi, Morrisville, NC (US); David Brittain Bolen, Durham, NC (US)

(73) Assignee: NetApp, Inc., Sunnyvale, CA (US)

(*) Notice: Subject to any disclaimer, the term of this patent is extended or adjusted under 35 U.S.C. 154(b) by 784 days.

(21) Appl. No.: 12/262,506

(22) Filed: Oct. 31, 2008

(65) Prior Publication Data

US 2010/0115126 A1    May 6, 2010

(51) Int. Cl.
G06F 9/44 (2006.01)
G06F 15/16 (2006.01)
G06F 17/30 (2006.01)

(52) U.S. Cl.
CPC .... *G06F 17/30569* (2013.01); *G06F 17/30309* (2013.01)
USPC .......................... 709/205; 709/237; 717/170

(58) Field of Classification Search
CPC ................ G06F 8/65; G06F 8/70; G06F 8/71
USPC .................................... 709/230, 205; 717/170
See application file for complete search history.

(56) References Cited

U.S. PATENT DOCUMENTS

| | | | | |
|---|---|---|---|---|
| 6,125,400 | A * | 9/2000 | Cohen et al. | 709/247 |
| 6,609,159 | B1 * | 8/2003 | Dukach et al. | 719/331 |
| 7,574,710 | B1 * | 8/2009 | Jeyaraman et al. | 709/217 |
| 2002/0188743 | A1 * | 12/2002 | Schaffrath | 709/230 |
| 2003/0145315 | A1 * | 7/2003 | Aro et al. | 717/170 |
| 2006/0218538 | A1 * | 9/2006 | van Kesteren | 717/137 |
| 2007/0180149 | A1 * | 8/2007 | Vernal et al. | 709/246 |
| 2008/0127164 | A1 * | 5/2008 | Duffield et al. | 717/173 |

OTHER PUBLICATIONS

Auerbach, J., "TACT: a protocol conversion toolkit," Selected Areas in Communications, IEEE Journal on , vol. 8, No. 1, pp. 143-159, Jan. 1990.*
Zhao, J., Chen, J., and Zheng, G. 1997. Message conversion and a new type system for OO model. SIGPLAN Not. 32, 9 (Sep. 1997), 61-67.*
Bruce Spencer, Sandy Liu, The Semantic Web—ISWC 2004, Inferring Data Transformation Rules to Integrate Semantic Web Services, Oct. 19, 2004.*
Definiton of "instance" and "structure", Microsoft Dictionary, 1999, Micrrosoft Press.*

(Continued)

*Primary Examiner* — Taylor Elfervig
(74) *Attorney, Agent, or Firm* — Cooper Legal Group, LLC (57) ABSTRACT

Various computing components (such as devices, operating environments, and processes) may communicate by exchanging instances of a data collection, such as a class or data structure. However, the definition of the data collection may evolve to specify different numbers, types, properties, and orderings of the items in the data collection, and it may be difficult to verify the structure and contents of an instance received from another component and possibly of a different version. This difficulty may be mitigated by exchanging versioning information about the instance (e.g., as part of the communications wire protocol) and by allocating the converting such that the sender may downconvert to earlier versions requested by a recipient, while the recipient may upconvert to later versions than a version provided by a sender. These techniques may promote the accuracy and consistency of information exchange among many components that operate on different versions of the data collection.

20 Claims, 6 Drawing Sheets

(56) References Cited

OTHER PUBLICATIONS

Becker, K.; Lopes, A; Milojicic, D.; Pruyne, J.; Singhal, S., "Automatically Determining Compatibility of Evolving Services," Web Services, 2008. ICWS '08. IEEE International Conference on, vol., No., pp. 161,168, Sep. 23-26, 2008.*

Jianhua Liu; Jian Li, "A space-time block coding system with backward compatibility for OFDM-based WLANs," SoutheastCon, 2007. Proceedings. IEEE, vol., No., pp. 105,110, Mar. 22-25, 2007.*
JoongMan Kim; Seokung Yoon; YooJae Won; Jaeil Lee, "VoIP Secure Communication Protocol satisfying Backward Compatibility," Systems and Networks Communications, 2007. ICSNC 2007. Second International Conference on, vol., No., pp. 43,43, Aug. 25-31, 2007.*

* cited by examiner

AUTOMATED CONVERSION OF VERSIONED DATA COLLECTIONS

BACKGROUND

In many computing scenarios, various components may use an instance of a data collection, such as a class, a data structure, or a database record. These data collections are often stored and utilized according to a well-defined format identifying the number, types, and properties of the elements of the data collection (e.g., instances of a data structure may be structured as a four-byte signed integer, eight one-bit Boolean values, and a ten-character string.) Such data collections may also be shared among various components, such as devices communicating over a network or processes communicating through interprocess communication. The sharing may often involve serializing the elements of the data collection in a manner that omits information about the structure of the elements represented therein, and simply comprises a block of binary data. However, if the communicating components have a mutual understanding of the structure of the data collection, such instances may be exchanged and properly handled even in the absence of structural metadata.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Although many computing scenarios involve a defined structure of a particular data collection, the defined structure may change over time. For example, a first version of an application may define a structure of a data collection, but a second version of the application may alter the definition, and computers running different versions of the application may then be unable to exchange instances of the data collection. Some techniques for reducing such problems involve identifying the structure of the elements as part of the data collection (e.g., the XML-based Simple Object Access Protocol (SOAP)), but these techniques may undesirably increase the size of such instances and may cause inefficiency and reduced computing performance.

An alternative technique for mediating the communication of instances of a variable data collection involves a versioning of the data collection. A version identifier (such as a version number) may be associated with respective versions of the data collection, such that instances of the data collection that share a version identifier may be expected to conform to the structure of the data structure version. Two components sharing an instance of the data collection may then communicate the versioning information of an instance, and the instance may be converted to meet the structural definition of a preferred version of the data collection. As a first example, if a receiving component requests an instance of a versioned data item but specifies a preference for an earlier structural version, the sending component may downconvert the data item to the earlier structural version before sending it to the receiving component. As a second example, if a sending component delivers an instance of a particular version that precedes a version preferred by the receiving component, the receiving process may receive and upconvert the data item to the preferred version. In this manner, the communicating components may share structural version information about an instance of a data collection as part of the communications protocol, and the components may convert a particular representation of the instance to meet the versioning preferences of the components.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Many computing scenarios involve an exchange of data among two or more components, such as machines or devices that communicate across a network and processes in an operating environment that communicate through interprocess communication. This communication often involves an exchange of a data collection comprising a set of well-formatted data items, such as a database comprising records having particular attributes; a structure comprising primitive data types (e.g., an integer, a Boolean value, and a string); and a class encapsulating various member fields, methods, interfaces, etc.

The communicating components may share an understanding of the structure of the data collection. For example, an application or program defining a particular structure may operate on two machines that exchange instances of the structure. It will be appreciated that the "structure" of the data collection may be viewed as a blueprint, layout, arrangement, etc. for a particular type of data item, whereas an "instance" of the structure may be viewed as a specific data item or occurrence of the data collection that is organized in a particular manner, generally coincident with the layout of the structure. Many instances of the structure may concurrently or consecutively exist, and while two or more instances may contain different data, the data within the instances may be similarly organized according to the structure. The shared understanding of the structure of the data collection may be significant to the capacity of the components to communicate, because the structure may not be apparent from the contents of the data collection. As one example, an instance of a structure totaling 32 bytes of data might comprise four 64-bit long integers, or eight 32-bit integers, or 256 Boolean values. Moreover, a one-byte number might represent a signed value between −127 and 128 or an unsigned value between 0 and 256, etc. Because the data comprising a data collection may be construed as representing many sets of data items, accurate communication among various components may significantly depend on the shared understanding of the structural semantics of exchanged data collections.

However, as the information systems comprising such data collections evolve, the structure of a data collection may change. For example, the structure of records in a database may change as a database administrator alters the structure of database, and the structure of instances of a class may change as a programmer creates new versions of an application. Thus, a data collection (such as a data structure) may be structured in several versions that differ in various ways, such as by adding or removing data items, reordering the representation of the data items in the data collection, and/or modifying the format of particular data items. Moreover, it may not be possible or even desirable to unify all instances and representations according the most recent structural version; e.g., intercommunicating components may be executing different versions of an application that store instances of a data collection in different formats, and/or may operate on stored instances of the data collection that are variably formatted according to different versions of the data collection.

This variation may cause difficulties among components that exchange an instance of the data item, because a receiving component may not recognize a particular structural version of the data collection that the sending component chose for structuring the instance. In some cases, the receiving component may simply not understand the data collection (e.g., where a 32-byte data collection is expected but a 36-byte data collection is received.) In other cases, the receiving component may misinterpret the data structure (e.g., where the sending component has structured an instance as eight unsigned integers, but the receiving component handles the instances as eight signed integers), and may even be unable to detect that its understanding of the data collection is incorrect. In still other cases, the variation may cause significant operating problems for one or more components (e.g., where a larger-than-expected instance of the data collection causes a buffer overrun in the receiving component, or where a misread pointer value in the data collection causes a memory access fault.)

Figure 1:
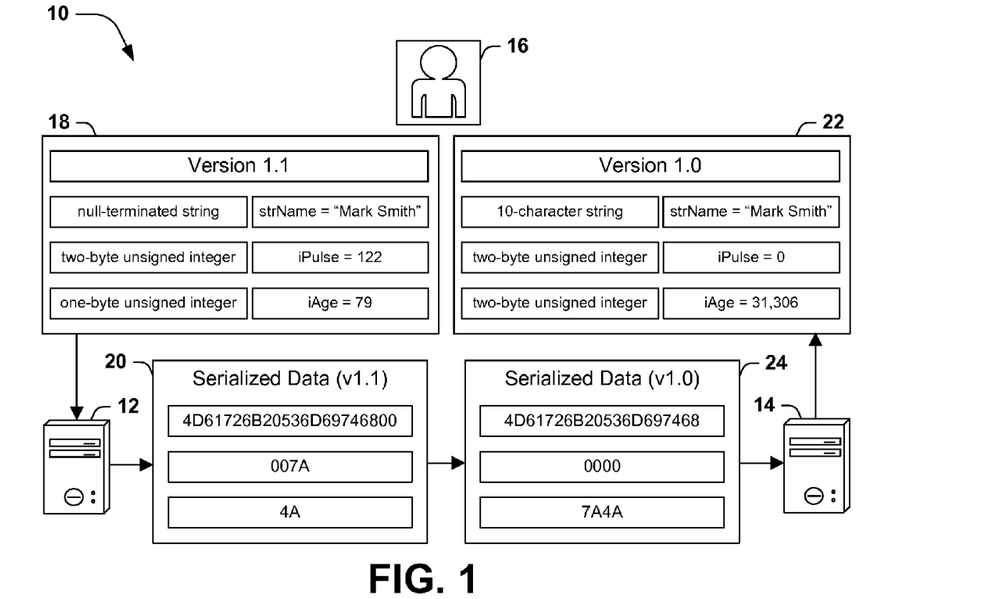
FIG. 1 is an illustration of an exemplary scenario involving an exchange of a data collection among two machines.

FIG. 1 illustrates a first exemplary scenario 10 in which the variable versioning of an instance of a data structure may create an operating difficulty. In this exemplary scenario 10, two computers acting as a sender 12 and a recipient 14 exchange an instance 16 of a data collection representing a medical record of an individual named Joe Smith with an age of 79 years and a pulse of 122 beats per minute. The sender 12 stores a representation of the instance 16 according to a first version 18 ("version 1.1"), wherein the name of the individual is represented as a variable-length, null-terminated string; the pulse of the individual is represented as a two-byte unsigned integer; and the age of the individual is represented as a one-byte unsigned integer. The sender 12 receives a request from the recipient 14 for the instance 16 of the data collection, and responds by generating a first serialization 20 of the instance 16 based on the formatting of the data items specified by the first version of the instance 16. (For example, if the network connection between the sender 12 and the recipient 14 may permit data to be transmitted only one item at a time, the formatting specified by the version of the instance 16 may indicate the order and arrangement in which elements of the instance 16 are to be sent. Accordingly, when the recipient 14 requests an instance 16 according to a version that specifies the manner of serializing the instance 16, the sender 12 may generate an appropriately arranged representation of the instance 16 for delivery to the recipient 14.) The first serialization 20 is then transmitted (e.g., over a network) to the recipient 14, which deserializes the instance 16 for use. However, the recipient 14 is programmed to accept such instances 16 according to a second version 22 of the data collection ("version 1.0," representing an earlier version), wherein the name is represented only as a ten-character fixed-size buffer, and wherein both the pulse and the age of the individual are represented as two-byte unsigned integers. The recipient 14 therefore handles the instance 16 according to a second serialization 24 formatted according to the second version 22 of the data collection. However, because the data is not correctly represented in this second version 22, the resulting data for the instance 16 is incorrect—the age of the individual is now indicated as 31,306 years, and the pulse of the individual is listed as zero.

Many techniques may be available to anticipate variable versioning of an exchanged data collection, and to adjust the formatting of an instance in order to maintain an accurate representation of the data. The XML-based Simple Object Access Protocol (SOAP) is one such technique, wherein the representation of the data collection includes a large amount of metadata that identifies the number, sizes, types, properties, and ordering of the elements of the data collection. However, the inclusion of metadata with an instance of the item may result in a significant increase in the size of the object. The increased size consequently consumes greater network resources in transmitting the instance and greater space in storing the instance, which may represent several significant sources of inefficiency (particularly where a large number of instances exist in only a few structural versions of the data collection.)

An alternative technique for exchanging versioned data collections involves a communication of versioning information among two or more communicating components while sharing a data collection. In this technique, an instance of a data collection may be represented according to a native version of the instance (i.e., the version of the data collection in which the instance is currently represented and stored by the sender 12.) When the sender and recipient exchange the instance, the recipient may specify a preferred version of the instance. If the preferred version is earlier than the native version of the data collection, the sender may downconvert the data collection to the earlier version before sending it to the recipient. Conversely, if the preferred version is later than the native version of the data collection, the sender may send the data collection in the native version, and the recipient may upconvert the instance to the preferred version upon receiving the instance. In this manner, the sender and recipient may cooperate to establish a conveyance of the instance to the recipient according to the preferred version.

Figure 2:
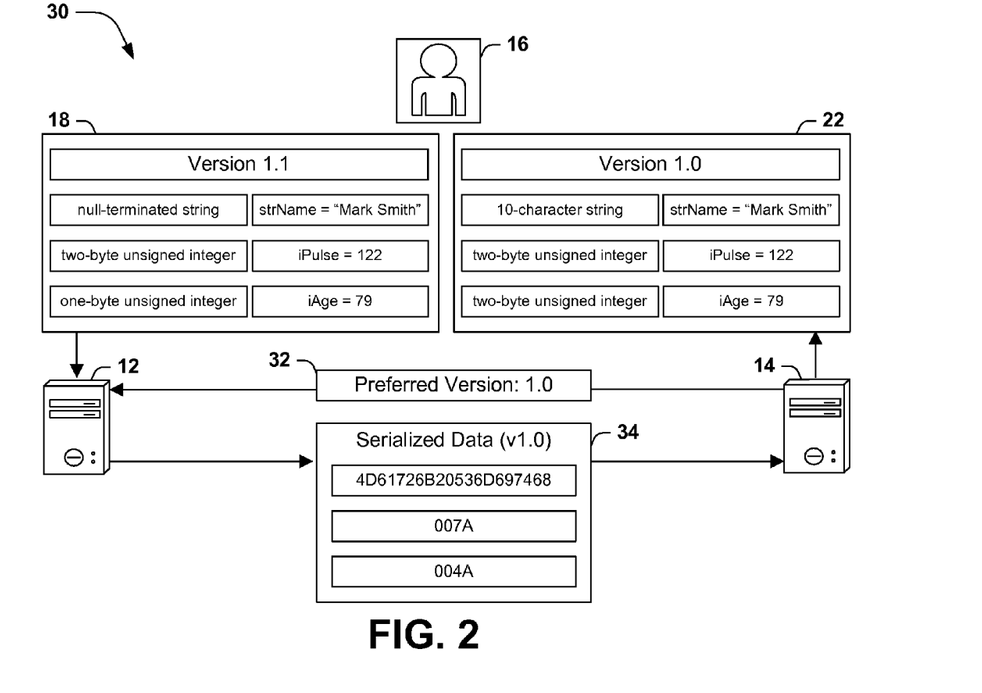
FIG. 2 is an illustration of another exemplary scenario involving an exchange of a data collection among two machines.

FIG. 2 illustrates an exemplary scenario 30 involving this alternative technique for exchanging instances 16 of the data collection between the sender 12 and the recipient 14. The sender 12 again stores the instance 16 according to a first version 18 (the native version), and the recipient 14 prefers a representation of the instance 16 according to a second version 22 of the data collection. If the sender 12 intends to deliver the instance 16 to the recipient 14 over a communications channel (e.g., via fiber-optic, co-axial, wireless, etc. network connection), the sender 12 "serializes" the instance 16 into a serialized representation that is suitable for transmission over the communications channel. For example, if the instance 16 contains a set of members, the serialized version may place the members in a particular order, and may specify the name and type of each member so that they can be transmitted in this serialized order. If the instance 16 contains references to local resources (such as other objects) that are locally available to the sender 12, the serialized version may specify these references with additional information that the recipient 14 may use to access the resources on the sender 12. The serialized representation of the instance 16 may be prepared and delivered over the communications channel to the recipient 14, which may then "deserialize" the instance 16 into a version that is usable on the recipient 14.

Before the instance 16 is serialized and delivered, the recipient 14 specifies to the sender 12 a recipient version indicator 32 that indicates the second version 22 as a preferred version of the instance 16 that is preferred by the recipient 14. The sender 12 compares the recipient version indicator 32 with the native version of instance 16 and determines that the preferred version is earlier than the native version. The sender 12 therefore generates a converted data collection formatted according to the second version 22, and sends a preferred serialization 34 to the recipient 14. The recipient 14 may then handle the instance 16 according to the formatting specified by the second version 22, which is consistent with the information represented in the first version 18 in which the instance 16 is natively represented. Conversely (though not illustrated in FIG. 2), if the comparison had indicated that the preferred version were later than the native version of the instance 16, the sender 12 may have sent the first serialization 20 formatted according to the first version 18 in which the instance 16 is natively formatted, and the recipient 14 may have upconverted the instance 16 to the preferred format upon receipt. Thus, by communicating versioning information for the instance 16 as part of the wire protocol in sending and receiving such data collections, the sender 12 and recipient 14 cooperate to improve the accurate representation and use of the data represented therein.

Figure 3:
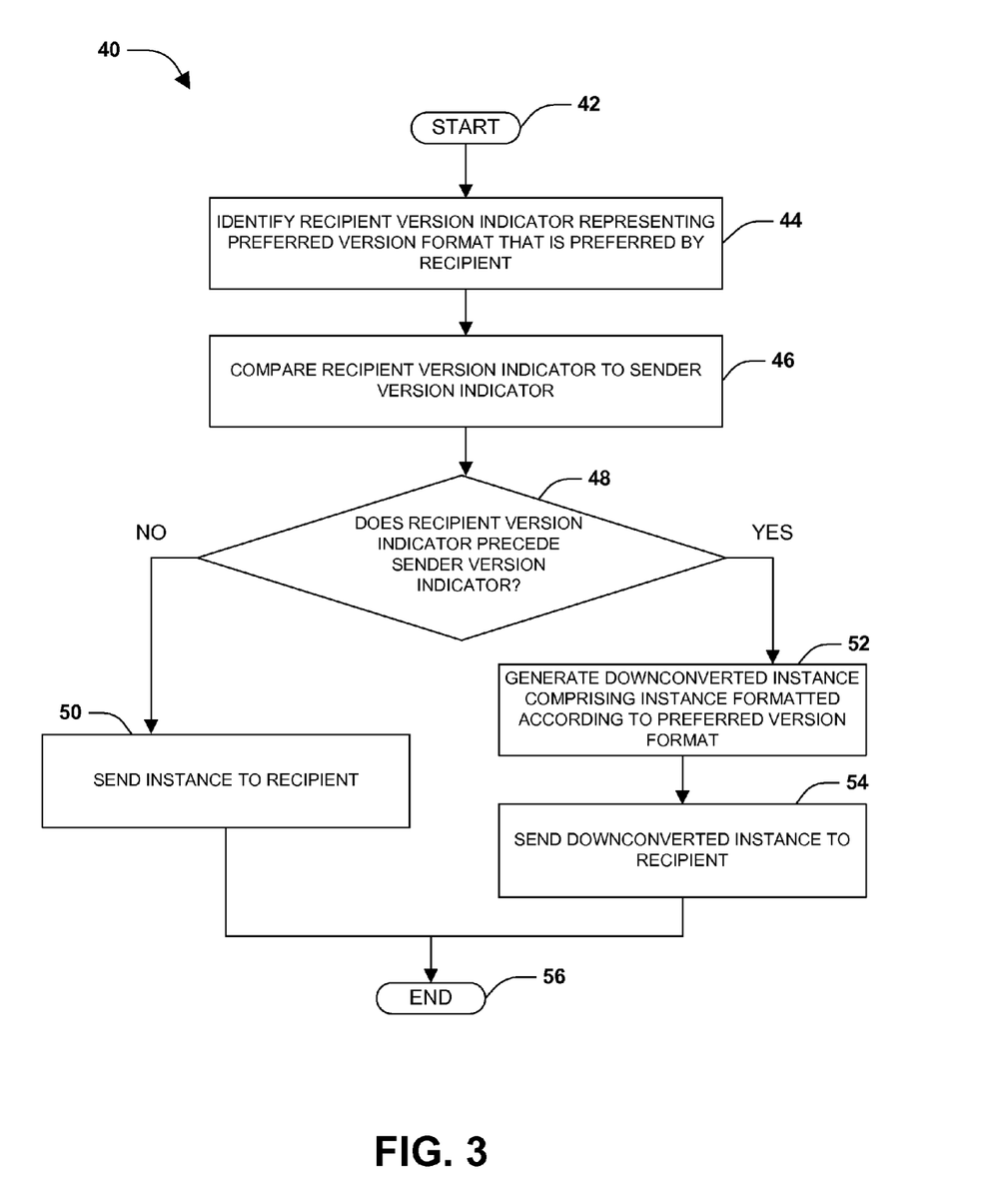
FIG. 3 is a flow chart illustrating an exemplary method of versioning an instance of a data collection comprising a sender version indicator in response to a request by a recipient.

FIG. 3 illustrates a first embodiment embodying the techniques illustrated in FIG. 2, comprising an exemplary method 40 of versioning an instance 16 of a data collection comprising a sender version indicator in response to a request by a recipient 14. A sender 12 may utilize this exemplary method 40 to promote delivery of a preferred version of the instance 16 of the data collection, such as where the recipient prefers (e.g., is merely equipped to handle) an earlier version of the instance 16 of the data collection. The exemplary method 40 begins at 42 and involves identifying 44 a recipient version indicator representing a preferred version that is preferred by the recipient. The recipient version indicator may, for example, indicate that the recipient is merely equipped to handle versions 2.0 or lower/earlier. The exemplary method 40 also involves comparing 46 the recipient version indicator to the sender version indicator. If the recipient version indicator does not precede the sender version indicator, the exemplary method 40 branches at 48 and involves sending 50 the instance 16 to the recipient 14. However, if the recipient version indicator precedes the sender version indicator, the exemplary method 40 branches at 48 and involves generating 52 a downconverted instance comprising the instance 16 that is formatted according to the preferred version, and sending 54 the downconverted instance to the recipient 14. After either sending 50 the instance 16 to the recipient 14 or sending 54 the downconverted instance to the recipient 14, the exemplary method 40 promotes the representation of the instance 16 to the recipient 14 according to a preferred version, and so ends at 56.

Figure 4:
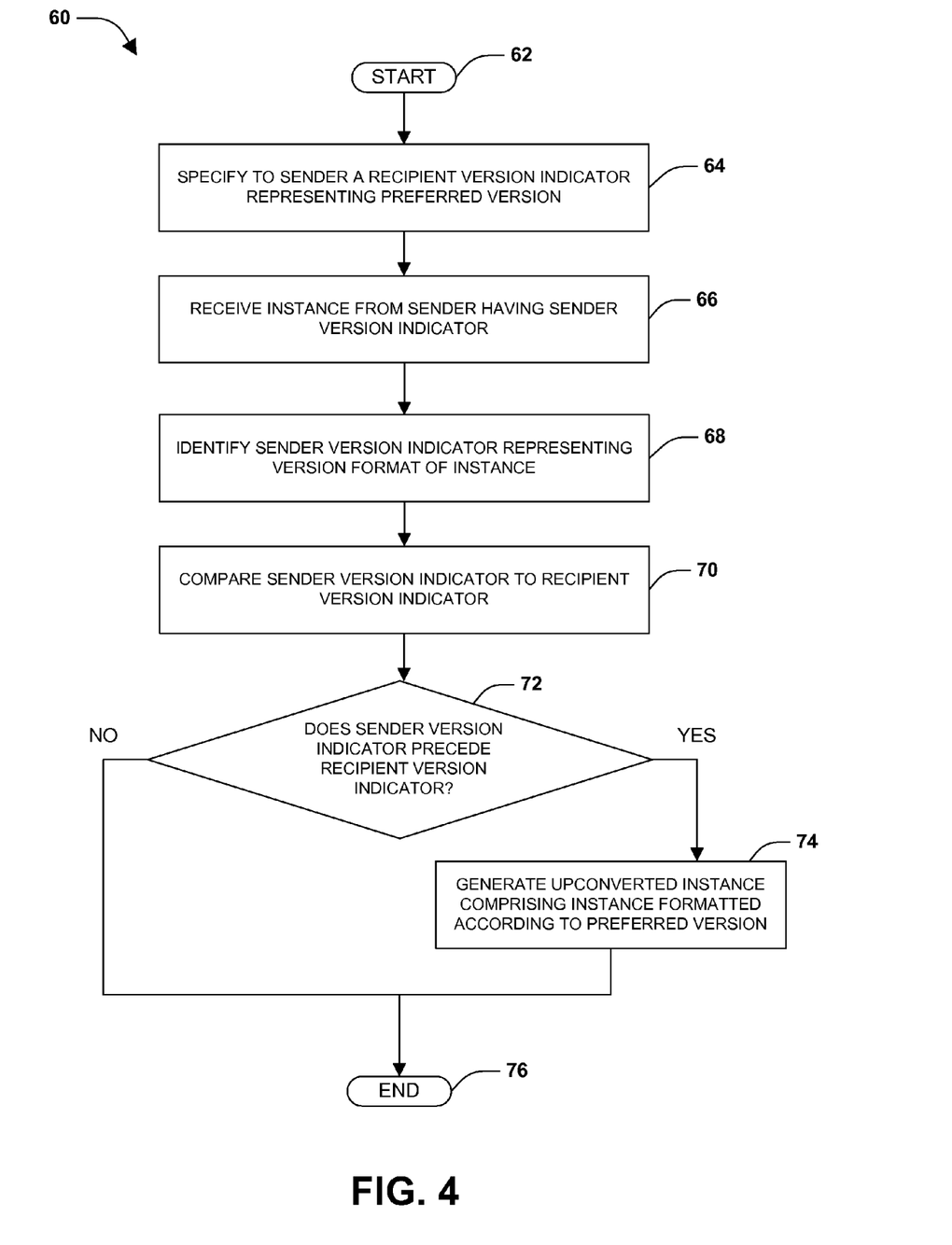
FIG. 4 is a flow chart illustrating an exemplary method of receiving from a sender an instance of a data collection comprising a sender version indicator and formatted according to a preferred version.

FIG. 4 illustrates a second embodiment of the techniques illustrated in FIG. 2, comprising an exemplary method 60 of receiving from a sender 12 an instance 16 of a data collection comprising a sender version indicator and formatted according to a preferred version. This exemplary method 60 may be utilized by a recipient 14 in promoting a receiving of the instance 16 in a preferred format. The exemplary method 60 begins at 62 and involves specifying 64 to the sender 14 a recipient version indicator representing the preferred version. The exemplary method 60 also involves receiving 66 the instance 16 from the sender 14 having a sender version indicator. The exemplary method 60 also involves identifying 68 a sender version indicator representing a version of the instance 16, and comparing 70 the sender version indicator to a recipient version indicator. If the sender version indicator precedes the recipient version indicator, the exemplary method 60 branches at 72 and involves generating 74 an upconverted instance comprising the instance 16 formatted according to the preferred version, after which the exemplary method 60 ends at 76. However, if the sender version indicator does not precede the recipient version indicator, the exemplary method 60 branches at 72 and then ends at 76. In this manner, the exemplary method 60 may be utilized to promote a receiving of the instance 16 by the recipient 14 in a representation formatted according to the preferred version.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 40 of FIG. 3 and the exemplary method 60 of FIG. 4) to confer individual and/or synergistic advantages upon such embodiments.

A first aspect that may vary among embodiments of these techniques relates to the scenarios in which the techniques may be utilized. As a first example, the components that cooperate in communicating the format may comprise many types of components, such as (e.g.) two devices or computers communicating over a network or direct connection in a server/client and/or a peer-to-peer arrangement; two hardware devices communicating within a machine over a bus; two processes executing two different versions of an application (each application version defining a different structure for a data collection); etc. As a second example, the sending and receiving of the instance may be performed in many ways, such as a serialization, serial transmission, and deserialization of the instance (discussed above); a parallel delivery involving a parallel transmission of various items of the instance; an on-demand delivery of various members upon request of the recipient; etc. As a third example, the communication between the sender and the recipient may involve many elements (such as a physical layer, wherein the sender and recipient cooperate to exchange bitwise data in a reliable manner; a transport layer, wherein the sender and recipient cooperatively arrange to assemble exchanged data in a reliable manner with error correction; and an application layer, wherein the sender and recipient agree to use exchanged data in a particular manner that suits a particular application.) The techniques discussed herein may be implemented in many such layers, such as in a physical device (e.g., a network adapter configured to exchange versioned instances), a communication protocol (e.g., a network layer implemented in a computer to permit applications to establish communications sessions of a particular type), and/or an application that involves exchanging instances of versioned data collections. As a fourth example, the sender and/or recipient may store data relating to these techniques (such as a representation of an instance of the data collection, or version indicators that are preferred or supported by each other) in many ways, such as (e.g.) in volatile system memory, on a hard disk drive, or on an optical disc. While various storage devices and techniques may have relative advantages or disadvantages in comparison with other storage devices and techniques, the sender and recipient may utilize any suitable manner of storing such data while implementing the techniques discussed herein.

As a fifth example of this first aspect, the exchange of the instance may arise in many scenarios, such as a receiver requesting the specific instance from the sender; the receiver requesting all instances of a particular data collection from the sender; the client accepting any type of data from the sender, which happens to include the instance of the data collection; etc. As a sixth example, many types of data collections may also be involved in the application of these techniques, such as instances of data structures comprising primitive element types; instances of a class comprising various member fields, methods, interfaces, etc.; and records of a database table that has been altered to embody a varying structure among different versions of the database table. As a seventh example, the preference specified by the receiver may be based on many types of criteria; e.g., the preference may represent the latest version of the data collection known to the recipient, a version that the recipient is better able to handle than other versions, etc. Those of ordinary skill in the art may devise many variations among these and many other aspects of the scenarios in which the techniques described herein may be utilized.

A second aspect that may vary among implementations of these techniques relates to the manner of specifying the version indicators for respective instances of the data collection. As a first example, the version indicators may be specified, ordered, and compared in many manners, such as an integer representation ("version 1" as earlier than "version 2"), a floating-point number representation ("version 1.1.1" as earlier than "version 1.1.2"), a date representation ("version 2008.12.31" as earlier than "version 2008.11.30"), etc. As a second example, the version indicators may be associated with an instance of the data collection in many ways. In one such embodiment, the version indicator may be stored as an item of the data collection. For example, an instance of a Medical Record class may include a version indicator member indicating the version of the instance 16 (e.g., as the first member of the instance, or as part of a wrapper of the instance.) The sender 12 and receiver 14 may reference the particular structural version of the Medical Record class indicated by the version indicator member in order to convert, transmit, and receive the instance (e.g., in order to determine how to serialize and/or deserialize the instance.) Alternatively or additionally, the version indicators may also be specified for the instances of a data collection that are exchanged or preferred by a particular component; e.g., the version indicator may be associated with a process to identify the version of an application executing therein and the versions of the data collection that the process is capable of exchanging. For example, the instance 16 may be represented during a communication session with a recipient, such as when a web browser connects to a webserver to request some items comprising a web page, and the server and client may communicate information about versions of such items during the period of web service. In such scenarios, the recipient 14 may send the recipient version indicator while establishing the communication session (e.g., during a communication session handshake.) Upon receiving the recipient version indicator from the recipient 14, the sender 12 may store the recipient version indicator; and while sending an instance 16 of the data collection to the recipient 14, the sender 12 may identifying the recipient version indicator by retrieving the stored recipient version indicator. Alternatively or additionally, the recipient version indicator may by specified with a request for the instance 16 issued by the recipient 14, and the sender 12 may identify the recipient version indicator before sending the instance 16 by referencing the recipient version indicator specified in the request. Conversely, the sender 12 may also specify the sender version indicator in a similar manner, e.g., upon receiving a request for an instance 16 accessible to the sender 12, or during the establishing of the communication session. Those of ordinary skill in the art may devise many ways of specifying and communicating version indicators of various instances 16 of data collections while implementing the techniques discussed herein.

A third aspect that may vary among implementations of these techniques relates to the organization of the process for converting an instance 16 of a data collection during either a downconversion to an earlier version of the data collection or an upconversion to a later version of the data collection. As a first example, the converting may be achieved through many conversion mechanisms. In one such embodiment, the converting may be implemented in a method that generally converts instances of an arbitrary version (x) directly to an arbitrary version (y). In a second embodiment, the converting may be achieved through a set of methods that convert form a specific version (x) to a specific version (y), and may be chained together for other conversions (e.g., converting from version 1 to version 3 by utilizing in series a Convert1To2( ) method and a Conver2To3( ) method.) This embodiment might be devised, e.g., as a set of methods that convert from any version to a common version, and then convert from the common version to any other version. In a fourth embodiment, the converting may be included as part of a method of serializing and/or deserializing instances 16 of the data collection according to a version indicator specified by a sender 12 and/or a recipient 14. In a fifth embodiment, the converting may be achieved through the application of a transformation descriptor, which may declaratively specify the types, properties, and organization of the items in an instance of the data collection formatted according to a particular version.

A specific scenario in which the factoring of the converting may be relevant involves a sequence of versions of the data collection in an application, wherein a process that is executing a particular version of the application may be able to exchange data structures defined in that version of the application and all prior versions, but not subsequent versions. The application may therefore include a function for upconverting earlier versions of an instance to the current version of the instance, and for downconverting the current version of an instance to an earlier version of the instance, but cannot convert instances to or from versions defined in later versions of the application (i.e., the application is backwards-compatible but not forwards-compatible.) Two processes that are executing different versions of the application may therefore utilize the techniques discussed herein to establish exchanges of such instances that both processes may utilize. For example, if a sending process determines that it is using a later version of the application (and data collection) than a recipient process, it may utilize the exemplary method 40 of FIG. 3 to downconvert the instance to the current version used by the recipient process prior to sending the instance. On the other hand, if the sending process determines that it is using an earlier version of the application (and data collection) than the recipient process, it may send its current (native) version of the instances, and the recipient process may upconvert the instances to the current (later) version used by the recipient process upon receiving the instances. In this manner, a compatible exchange of the versioned instances may be promoted as part of the wire protocol whereby the processes communicate. This example illustrates but one scenario wherein these techniques may be factored and applied, but those of ordinary skill in the art may choose among many factorings for achieving the converting while implementing the techniques discussed herein.

A fourth aspect that may vary among implementations of these techniques relates to the particular manner in which an instance 16 may be converted. As one such example, the converting may reorder and reorganize the data in a binary representation of the instance 16, e.g., by operating on a bytewise view of the instance 16. Alternatively or additionally, where the instance comprises at least one member and where the preferred version specifies a representation format of the at least one member, the converting may involve translating respective members of the instance to the representation format of the member in the preferred version. This variation may apply a memberwise conversion that translates each member of the instance to the format of the member in the preferred version. For example, in FIG. 2, the converting may involve converting the strName element from the variable-length, null-terminated string specified in the first version 18 to the fixed-length, 10-character string specified in the second version 22 and converting the iAge element from the one-byte unsigned integer format specified in the first version 18 to the two-byte unsigned integer format specified in the second version 22 (while leaving intact the representation of the iPulse element that is similarly represented in the first version 18 and the second version 22.) This memberwise converting may involve reordering elements, e.g., where the order in which various members are serialized differs among versions of the data collection. This memberwise converting may also involve resizing blocks of memory. For example, where a member of an instance 16 comprising an array of an array size, and where the preferred version of the instance 16 specifies a preferred version array size that differs from the array size, the converting may involve resizing the array to a preferred version array sized according to the preferred version array size. The converting may also involve omitting a member from the converted instance that is not included in the format specified by the preferred version, and/or inserting a member that is included in the format specified by the preferred version but that is not included in the native format of the instance. A newly inserted member may also be inserted, e.g., with a default value, and/or by invoking a default constructor for the new member. Those of ordinary skill in the art may devise many ways of converting instances of a data collection while implementing the techniques discussed herein.

Figure 5:
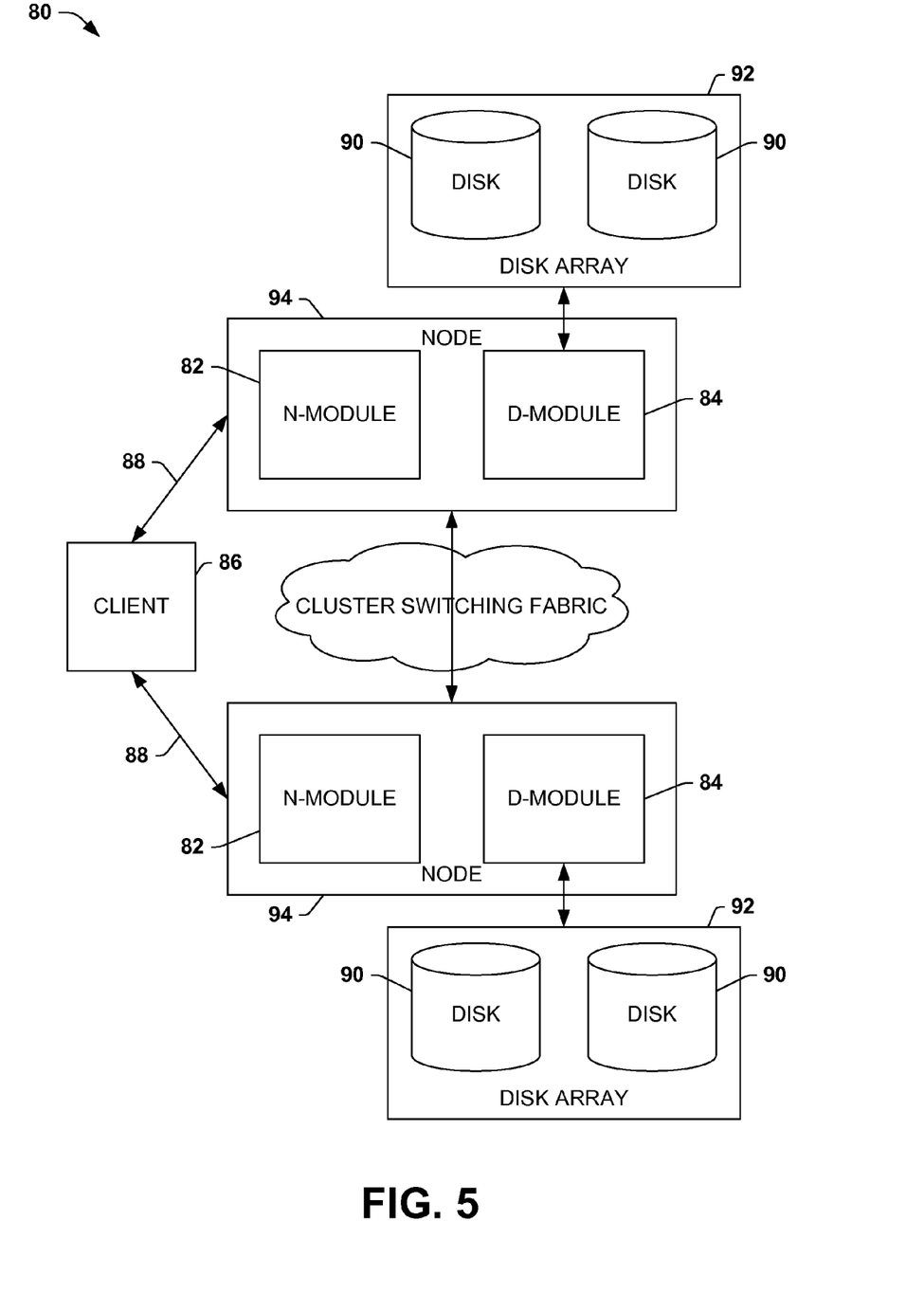
FIG. 5 is an illustration of an exemplary cluster environment in which the techniques discussed herein may be utilized.

FIG. 5 illustrates a scenario wherein the techniques discussed herein may be embodied, comprising an exemplary cluster environment 80 of interconnected nodes 94 configured to provide data storage services, wherein a virtual user interface failover scheme as provided herein can be implemented. The respective nodes 94 generally comprise, e.g., a network element 82 (N-Module) and a disk element 84 (D-Module), where at least some of these elements 82, 84 may be comprised within memory of a node. The disk elements 84 in the illustrated example are coupled to one or more storage devices, such as disks 90 of a disk array 92. Such disks 90 may implement data storage on any suitable type of storage media, such as optical, magnetic, electronic and/or electromechanical storage devices, for example. It may be appreciated that while there are an equal number of network 82 and disk 84 modules depicted in the illustrated example, there may be differing numbers of these elements. For example, there may not be a one-to-one correspondence between the network 82 and disk 84 modules in the different nodes 94. Similarly, while merely two nodes 94 are illustrated in the example depicted in FIG. 5, such a cluster 80 can comprise any suitable number of nodes to provide desired storage services (e.g., n nodes, where n is a positive integer). The disk elements 84 may be configured to facilitate accessing data on the disks 90 of the arrays 92, while the network elements 82 are configured to facilitate connection to one or more client devices 86 (e.g., one or more general purpose computers) as well as interconnection between different nodes. Connection to one or more clients 86 may occur via an Ethernet and/or Fibre Channel (FC) computer network 88, for example, while interconnection between different nodes may occur via a cluster switching fabric 114 (e.g., a Gigabit Ethernet switch).

The exemplary cluster 80 illustrated in FIG. 5 is an example of an embodiment where the techniques and systems, described herein, may be implemented. For example, the modules 82 and 84 may communicate with a distributed transactional database (DTDB), for example, stored in the disk array 92 of respective nodes 94 in the cluster 80. In this example, the modules 82 and 84 may be used to coordinate communication with instances of the DTDB on respective nodes 94 in the cluster 80. The modules 82 and 84 may be configured to store, exchange, and use representations of a DTDB in different versions, and to exchange representations or portions thereof in different formats. Thus, one or both of the modules 82, 84 may be configured to upconvert or downconvert representations of the DTDB or portions thereof in order to provide a version that the other module is capable of processing, and may utilize the techniques discussed herein to achieve such conversion. It may be appreciated that components, features, elements, etc. described herein that have functionalities and/or aspects related to accessing data may be comprised within and/or comprise one or more disk elements 84. Similarly, components, features, elements, etc. described herein that have functionalities and/or aspects related to networking and/or communications may be comprised within and/or comprise one or more network elements 82. It will also be appreciated that such N and D modules are commercially available from NetApp, Inc. of Sunnyvale, Calif.

Figure 6:
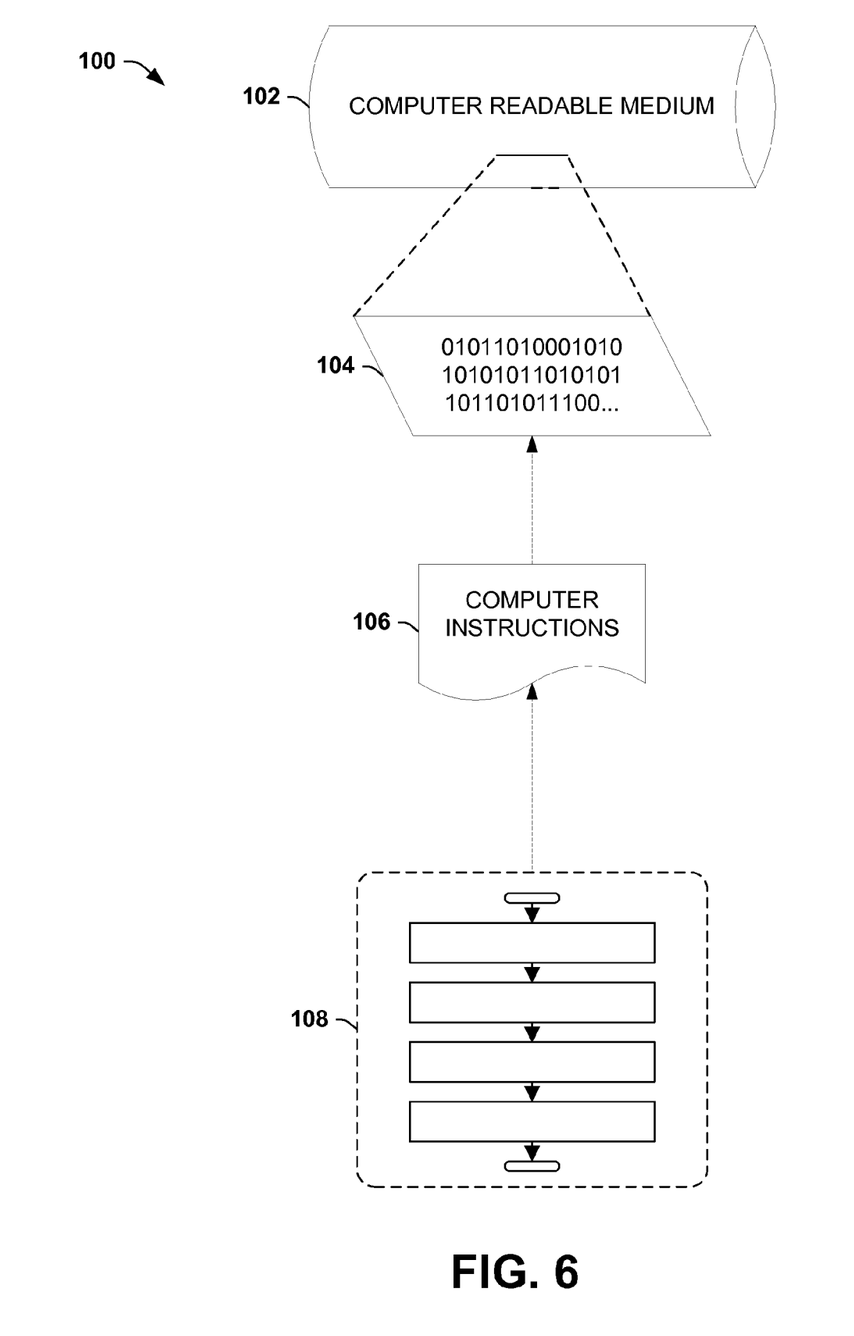
FIG. 6 is an illustration of an exemplary computer-readable medium comprising processor-executable instructions configured to embody one or more of the provisions set forth herein.

Still another embodiment involves a computer-readable medium comprising processor-executable instructions configured to apply the techniques presented herein. An exemplary computer-readable medium that may be devised in these ways is illustrated in FIG. 6, wherein the implementation 100 comprises a computer-readable medium 102 (e.g., a CD-R, DVD-R, or a platter of a hard disk drive), on which is encoded computer-readable data 104. This computer-readable data 104 in turn comprises a set of computer instructions 106 configured to operate according to the principles set forth herein. In one such embodiment, the processor-executable instructions 106 may be configured to perform a method of versioning an instance of a data collection comprising a sender version indicator, such as the exemplary method 40 of FIG. 3, and/or a method of receiving from a sender an instance of a data collection comprising a sender version indicator and formatted according to a preferred version, such as the exemplary method 60 of FIG. 4. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 7:
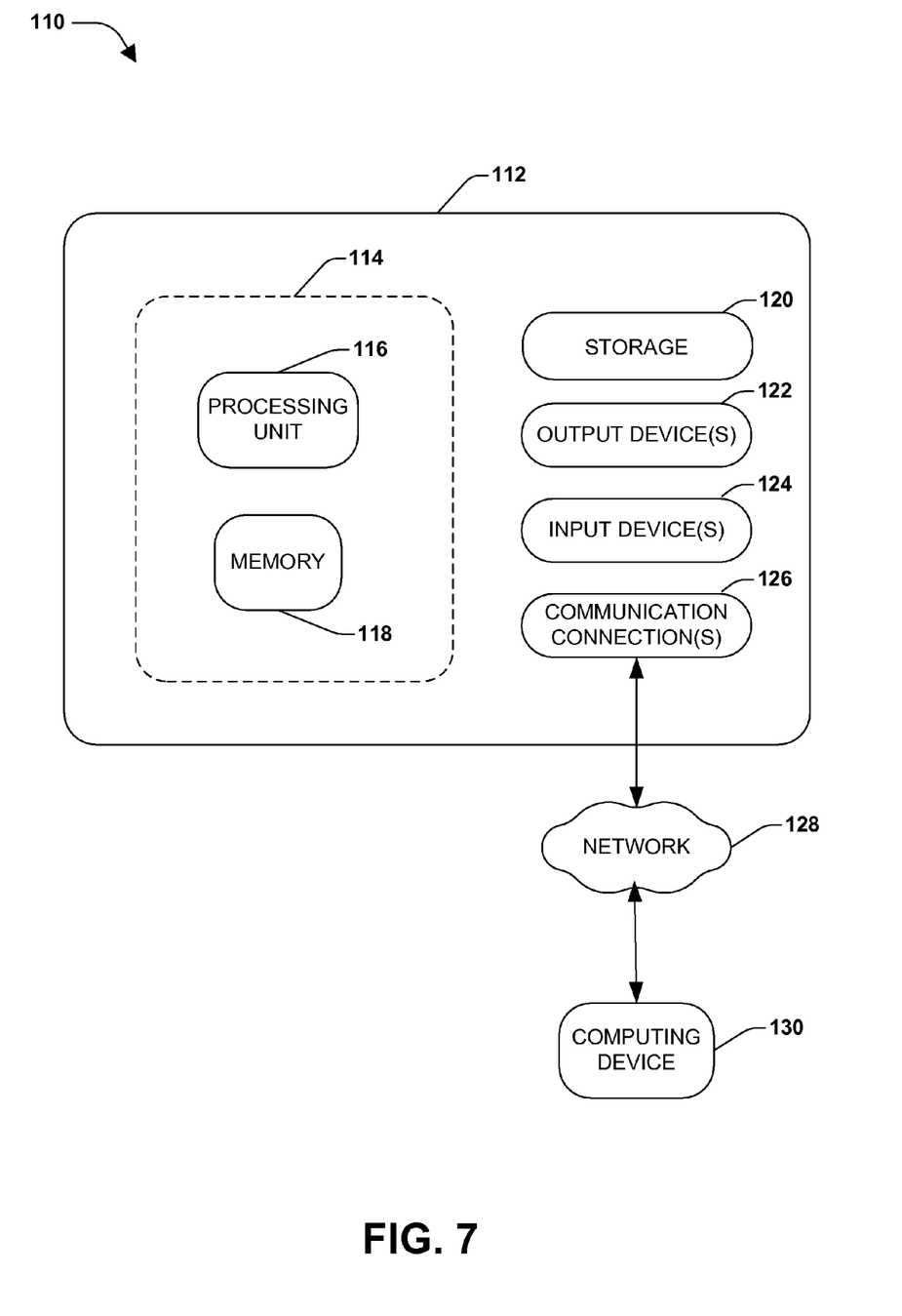
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 110 comprising a computing device 112 configured to implement one or more embodiments provided herein. In one configuration, computing device 112 includes at least one processing unit 116 and memory 118. Depending on the exact configuration and type of computing device, memory 118 may be volatile (such as RAM, for example), non-volatile (such as ROM, flash memory, etc., for example) or some combination of the two. This configuration is illustrated in FIG. 7 by dashed line 114.

In other embodiments, device 112 may include additional features and/or functionality. For example, device 112 may also include additional storage (e.g., removable and/or non-removable) including, but not limited to, magnetic storage, optical storage, and the like. Such additional storage is illustrated in FIG. 7 by storage 120. In one embodiment, computer readable instructions to implement one or more embodiments provided herein may be in storage 120. Storage 120 may also store other computer readable instructions to implement an operating system, an application program, and the like. Computer readable instructions may be loaded in memory 118 for execution by processing unit 116, for example.

The term "computer readable media" as used herein includes computer storage media. Computer storage media includes volatile and nonvolatile, removable and non-removable media implemented in any method or technology for storage of information such as computer readable instructions or other data. Memory 118 and storage 120 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 112. Any such computer storage media may be part of device 112.

Device 112 may also include communication connection(s) 126 that allows device 112 to communicate with other devices. Communication connection(s) 126 may include, but is not limited to, a modem, a Network Interface Card (NIC), an integrated network interface, a radio frequency transmitter/recipient, an infrared port, a USB connection, or other interfaces for connecting computing device 112 to other computing devices. Communication connection(s) 126 may include a wired connection or a wireless connection. Communication connection(s) 126 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 112 may include input device(s) 124 such as keyboard, mouse, pen, voice input device, touch input device, infrared cameras, video input devices, and/or any other input device. Output device(s) 122 such as one or more displays, speakers, printers, and/or any other output device may also be included in device 112. Input device(s) 124 and output device(s) 122 may be connected to device 112 via a wired connection, wireless connection, or any combination thereof. In one embodiment, an input device or an output device from another computing device may be used as input device(s) 124 or output device(s) 122 for computing device 112.

Components of computing device 112 may be connected by various interconnects, such as a bus. Such interconnects may include a Peripheral Component Interconnect (PCI), such as PCI Express, a Universal Serial Bus (USB), firewire (IEEE 13114), an optical bus structure, and the like. In another embodiment, components of computing device 112 may be interconnected by a network. For example, memory 118 may be comprised of multiple physical memory units located in different physical locations interconnected by a network.

Those skilled in the art will realize that storage devices utilized to store computer readable instructions may be distributed across a network. For example, a computing device 130 accessible via network 128 may store computer readable instructions to implement one or more embodiments provided herein. Computing device 112 may access computing device 130 and download a part or all of the computer readable instructions for execution. Alternatively, computing device 112 may download pieces of the computer readable instructions, as needed, or some instructions may be executed at computing device 112 and some at computing device 130.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of versioning an instance of a data collection, comprising:

receiving a request from a recipient for an instance of a data collection stored by a sender according to a sender version indicator, the instance represented during a communication session with the recipient and the data collection comprising a database record;

identifying, from the request, a recipient version indicator representing a recipient preferred version of the data collection, the identifying comprising:

receiving the recipient version indicator from the recipient while establishing the communication session with the recipient;

storing the recipient version indicator; and retrieving the stored recipient version indicator when the request is subsequently received from the recipient;

comparing the sender version indicator with the recipient version indicator;

responsive to the sender version indicator preceding the recipient version indicator based upon the comparing, sending the instance to the recipient for upconverting, by the recipient, the instance to the recipient preferred version; and responsive to the recipient version indicator preceding the sender version indicator based upon the comparing and the sender not having stored a second instance of the data collection according to the recipient version indicator, generating, by the sender, a downconverted instance of the data collection formatted according to the recipient preferred version and sending the downconverted instance to the recipient, the generating a downconverted instance comprising:

changing an order of serialization of members of the instance of the data collection; and for respective members within at least one of the instance of the data collection or the recipient preferred version of the data collection:

responsive to a first member of the instance being formatted according to a representation format of the recipient preferred version, providing the first member for sending as at least part of the downconverted instance;

responsive to a second member of the instance being formatted differently than the representation format of the recipient preferred version:

translating the second member to the representation format to generate a translated member, the translating comprising at least one of:

reordering elements associated with the second member; or resizing blocks of memory associated with the second member if an array size of an array associated with the second member differs from a preferred version array size of the recipient preferred version to resize the array to the preferred version array size;

serializing the translated member; and providing the translated member for sending as at least part of the downconverted instance;

responsive to a third member of the recipient preferred version not being included in the instance:
  generating a default member corresponding to the third member, the default member having a default value, and
  providing the default member for sending as at least part of the downconverted instance; and
responsive to a fourth member of the instance not being included in the recipient preferred version, discarding the fourth member.

2. The method of claim 1, comprising:
serializing the first member.

3. The method of claim 1, comprising:
serializing the default member.

4. The method of claim 1, the generating a downconverted instance comprising:
if the first member comprises an array of an array size that is different than a preferred version array size of the recipient preferred version, resizing the array to the preferred version array size.

5. The method of claim 1, the recipient version indicator specified with the request.

6. The method of claim 5, the retrieving comprising:
retrieving the recipient version indicator specified in the request.

7. The method of claim 1, the recipient version indicator comprising an integer representation.

8. The method of claim 1, the recipient version indicator comprising at least one of a floating-point number representation or a date representation.

9. A method of versioning an instance of a data collection, comprising:
  receiving a sender version indicator from a sender while establishing a communication session with the sender;
  storing the sender version indicator;
  receiving, at a recipient, an instance of a data collection from the sender, the instance represented during the communication session and formatted according to a sender version represented by the sender version indicator, the data collection comprising a database record;
  retrieving the stored sender version indicator responsive to the receiving an instance;
  comparing the sender version indicator with a recipient version indicator representing a recipient preferred version of the data collection;
  responsive to the sender version indicator preceding the recipient version indicator, generating, by the recipient, an upconverted instance of the data collection from the instance,
  the generating an upconverted instance comprising:
    changing an order of serialization of members of the instance of the data collection; and
    for respective members within at least one of the instance of the data collection received from the sender or the recipient preferred version of the data collection:
      responsive to a first member of the instance being formatted according to a representation format of the recipient preferred version, including the first member in the upconverted instance;
      responsive to a second member of the instance being formatted differently than the representation format of the recipient preferred version:
        translating the second member to the representation format to generate a translated member, the translating comprising at least one of:
          reordering elements associated with the second member; or
          resizing blocks of memory associated with the second member if an array size of an array associated with the second member differs from a preferred version array size of the recipient preferred version to resize the array to the preferred version array size; and
        including the translated member in the upconverted instance;
      responsive to a third member of the recipient preferred version not being included in the instance:
        generating a default member corresponding to the third member, the default member having a default value, and
        including the default member in the upconverted instance; and
      responsive to a fourth member of the instance not being included in the recipient preferred version, discarding the fourth member.

10. The method of claim 9, the generating an upconverted instance comprising:
deserializing the first member.

11. The method of claim 9, the generating an upconverted instance comprising:
if the first member comprises an array of an array size that is different than a preferred version array size of the recipient preferred version, resizing the array to the preferred version array size.

12. The method of claim 9, the generating an upconverted instance comprising:
deserializing the second member.

13. The method of claim 9, the generating an upconverted instance comprising:
deserializing the fourth member.

14. The method of claim 9, the receiving an instance comprising:
receiving the instance from the sender based upon a prior request sent from the recipient to the sender.

15. A system, comprising:
one or more processing units; and
memory comprising instructions that when executed by at least one of the one or more processing units perform a method of versioning an instance of a data collection, the method comprising:
  receiving a sender version indicator from a sender while establishing a communication session with the sender;
  storing the sender version indicator;
  receiving, at a recipient, the instance of the data collection from the sender, the instance represented during the communication session and formatted according to a sender version represented by the sender version indicator, the data collection comprising a database record;
  retrieving the stored sender version indicator responsive to the receiving an instance;
  comparing the sender version indicator with a recipient version indicator representing a recipient preferred version of the data collection;
  responsive to the sender version indicator preceding the recipient version indicator, generating an upconverted instance of the data collection from the instance,
  the generating an upconverted instance comprising:
    changing an order of serialization of members of the instance of the data collection; and for respective members within at least one of the instance of the data collection received from the sender or the recipient preferred version of the data collection:
- responsive to a first member of the instance being formatted according to a representation format of the recipient preferred version, including the first member in the upconverted instance;
- responsive to a second member of the instance being formatted differently than the representation format of the recipient preferred version:
  - translating the second member to the representation format to generate a translated member, the translating comprising at least one of:
    - reordering elements associated with the second member; or
    - resizing blocks of memory associated with the second member if an array size of an array associated with the second member differs from a preferred version array size of the recipient preferred version to resize the array to the preferred version array size; and
  - including the translated member in the upconverted instance;
- responsive to a third member of the recipient preferred version not being included in the instance:
  - generating a default member corresponding to the third member, the default member having a default value, and
  - including the default member in the upconverted instance; and
- responsive to a fourth member of the instance not being included in the recipient preferred version, discarding the fourth member.

16. The system of claim 15, the generating an upconverted instance comprising:
deserializing the first member.

17. The system of claim 15, the generating an upconverted instance comprising:
if the first member comprises an array of an array size that is different than a preferred version array size of the recipient preferred version, resizing the array to the preferred version array size.

18. The system of claim 15, the generating an upconverted instance comprising:
deserializing the second member.

19. The system of claim 15, the receiving an instance comprising:
receiving the instance from the sender based upon a prior request sent from the recipient to the sender.

20. The system of claim 15, the generating an upconverted instance comprising: deserializing the fourth member.

* * * * *